US011054003B2

(12) United States Patent
Fuhrmann

(10) Patent No.: US 11,054,003 B2
(45) Date of Patent: Jul. 6, 2021

(54) HYDRAULIC TENSIONING DEVICE FOR A CHAIN DRIVE

(71) Applicant: Schaeffler Technologies AG & Co. KG, Herzogenaurach (DE)

(72) Inventor: Rainer Fuhrmann, Waischenfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 307 days.

(21) Appl. No.: 16/099,041

(22) PCT Filed: May 3, 2017

(86) PCT No.: PCT/DE2017/100371
§ 371 (c)(1),
(2) Date: Nov. 5, 2018

(87) PCT Pub. No.: WO2017/190737
PCT Pub. Date: Nov. 9, 2017

(65) Prior Publication Data
US 2019/0170224 A1    Jun. 6, 2019

(30) Foreign Application Priority Data
May 4, 2016    (DE) ..................... 10 2016 207 782.1

(51) Int. Cl.
*F16H 7/08*    (2006.01)

(52) U.S. Cl.
CPC ....... *F16H 7/08* (2013.01); *F16H 2007/0812* (2013.01); *F16H 2007/0855* (2013.01);
(Continued)

(58) Field of Classification Search
CPC ..... F16H 2007/0806; F16H 2007/0859; F16H 2007/0812; F16H 7/0848
(Continued)

(56) References Cited

U.S. PATENT DOCUMENTS 5,931,754 A * 8/1999 Stief ...................... F01L 1/02
474/109
5,967,921 A * 10/1999 Simpson ................. F16H 7/08
474/110

(Continued)

FOREIGN PATENT DOCUMENTS

CN    1578887    2/2005
CN    104913014    9/2015
(Continued)

*Primary Examiner* — Henry Y Liu
(74) *Attorney, Agent, or Firm* — Volpe Koenig

(57) ABSTRACT

A hydraulic tensioning device for a chain drive, having a tensioning piston which is guided in a holder and which, on its outer circumferential surface, has locking grooves, an inner guide which projects into a cavity of the piston, and a locking element which has at least two annular sections and at least two radial extensions, wherein the locking element can be placed in engagement by the at least two annular sections with one of the locking grooves, and having a clamping stop and a sliding stop which are axially spaced apart from one another. To simplify the structural design, the holder has at least two axial extensions which extend in an axial direction between the clamping stop plane and the sliding stop plane, wherein the at least two axial extensions and the tensioning piston do not enclose the at least two radial extensions.

19 Claims, 4 Drawing Sheets

(52) U.S. Cl.
CPC ............... *F16H 2007/0859* (2013.01); *F16H 2007/0878* (2013.01); *F16H 2007/0891* (2013.01)

(58) Field of Classification Search
USPC .......................................................... 474/110
See application file for complete search history.

(56) References Cited

U.S. PATENT DOCUMENTS

| | | | | |
|---|---|---|---|---|
| 5,989,139 A * | 11/1999 | Dusinberre, II | .......... | F16H 7/08 474/110 |
| 6,120,402 A * | 9/2000 | Preston | ..................... | F16H 7/08 474/109 |
| 6,126,563 A * | 10/2000 | Simpson | ............... | F16H 7/0836 474/109 |
| 6,244,981 B1 * | 6/2001 | Simpson | ............... | F16H 7/0848 474/110 |
| 6,312,351 B1 * | 11/2001 | Simpson | ............... | F16H 7/0848 474/109 |
| 6,935,978 B2 * | 8/2005 | Hayakawa | ............ | F16H 7/0836 474/109 |
| 7,775,921 B2 * | 8/2010 | Izutsu | ................... | F16H 7/0848 474/110 |
| 8,257,212 B2 * | 9/2012 | Yoshimura | ............ | F16H 7/0848 474/110 |
| 8,727,922 B2 * | 5/2014 | Perissinotto | .......... | F16H 7/0848 474/110 |
| 9,022,887 B2 * | 5/2015 | Mishima | ............... | F16H 7/0848 474/110 |
| 2003/0139235 A1 * | 7/2003 | Yamamoto | ............ | F16H 7/0836 474/109 |
| 2004/0138018 A1 * | 7/2004 | Hayakawa | ............ | F16H 7/0836 474/122 |
| 2004/0266571 A1 * | 12/2004 | Izutsu | ................... | F16H 7/0848 474/110 |
| 2006/0094548 A1 * | 5/2006 | Sato | ..................... | F16H 7/0848 474/109 |
| 2006/0270500 A1 * | 11/2006 | Yamamoto | ............ | F16H 7/0836 474/109 |
| 2006/0281595 A1 * | 12/2006 | Narita | ................... | F16H 7/0848 474/109 |
| 2007/0213152 A1 * | 9/2007 | Yamamoto | ............ | F16H 7/0848 474/109 |
| 2008/0096707 A1 * | 4/2008 | Sato | ..................... | F16H 7/0836 474/111 |
| 2010/0093474 A1 * | 4/2010 | Onimaru | ............... | F16H 7/0848 474/110 |
| 2010/0130320 A1 * | 5/2010 | Kitano | ................. | F16H 7/0836 474/110 |
| 2010/0222167 A1 * | 9/2010 | Chekansky | ........... | F16H 7/0836 474/110 |
| 2011/0021298 A1 * | 1/2011 | Kurematsu | ........... | F16H 7/0836 474/110 |
| 2011/0028253 A1 * | 2/2011 | Perissinotto | .......... | F16H 7/0848 474/135 |
| 2011/0111898 A1 * | 5/2011 | Mishima | ............... | F16H 7/0848 474/101 |
| 2011/0111899 A1 * | 5/2011 | Mishima | ............... | F16H 7/0848 474/111 |
| 2011/0130232 A1 * | 6/2011 | Barrette | ................ | F16H 7/0848 474/101 |
| 2011/0287880 A1 * | 11/2011 | Hayami | ............... | F16H 7/0848 474/111 |
| 2012/0040790 A1 * | 2/2012 | Perissinotto | ............. | F16H 7/08 474/110 |
| 2013/0190117 A1 * | 7/2013 | Bauer | ...................... | F16H 7/08 474/111 |
| 2013/0203534 A1 * | 8/2013 | Schmid | ................ | F16H 7/0836 474/101 |
| 2013/0281238 A1 * | 10/2013 | Kurematsu | ............... | F16H 7/08 474/101 |
| 2016/0061299 A1 * | 3/2016 | Takagi | ................. | F16H 7/0848 474/101 |

FOREIGN PATENT DOCUMENTS

| | | |
|---|---|---|
| DE | 102012001074 | 7/2013 |
| DE | 102015215737 | 3/2016 |
| EP | 2395259 | 12/2011 |
| JP | 2011117530 | 6/2011 |
| WO | 2011068030 | 6/2011 |

* cited by examiner

HYDRAULIC TENSIONING DEVICE FOR A CHAIN DRIVE

BACKGROUND

The invention relates to a hydraulic tensioning device for a chain drive with a tensioning piston that is guided in a holder and has locking grooves on its outer peripheral surface, as well as with an inner guide that extends into a hollow space of the piston, and with a locking element that has at least two annular sections and at least two radial extensions, wherein the locking element can be brought into engagement with one of the locking grooves with the help of the at least two annular sections, and also with a clamping stop and a sliding stop that are spaced apart from each other in the axial direction.

Such hydraulic tensioning devices are known from US 2003/0 139 235 A1. Shown is a chain tensioner with a tubular housing with a base and a notch on one open end, with a piston that has a plurality of locking notches on the outer periphery and is installed in the inner periphery of the housing, with a restoring spring that applies an outward pressing force on the piston, with a stop ring that is installed between the inner periphery of the housing and the outer periphery of the piston, with a ring element that can slide in a guide groove in the axial direction, and with an actuation element for the radial expansion of the ring element, with a first stopper that limits the backward motion of the stop ring relative to the housing by fixing the stop ring in the guide groove, and with a second stopper with a smaller inner diameter than the outer diameter of the stop ring for limiting the forward motion of the stop ring relative to the housing, wherein the stop ring is blocked in the guide groove. One disadvantage is the requirement that the inner periphery of the housing must be subjected to complicated processing, in order to be able to install the stop ring between the inner periphery of the housing and the outer periphery of the piston, as well as between the first and the second stopper.

SUMMARY

Therefore, the objective of the invention is to disclose a hydraulic tensioning device with a simplified structural design.

The objective is achieved by a hydraulic tensioning device with one or more features of the invention.

Accordingly, the holder of the hydraulic tensioning device has at least two axial extensions that extend in the axial direction between the clamping stop plane and the sliding stop plane and are arranged separated from each other in the area of the sliding stop plane; at the same time the at least two axial extensions of the holder and the tensioning piston do not enclose the at least two radial extensions of the locking element.

In any case, two of the at least two axial extensions and the tensioning piston accordingly do not enclose two of the at least two radial extensions of the locking element in the radial direction, because the radial extensions of the locking element are arranged in the area of the axial extensions of the holder. Advantageously, complicated processing of the inner periphery of the holder can be eliminated in this respect. In particular, a surrounding groove on the inner periphery does not have to be provided. For example, it is thus possible to eliminate cutting post-processing in this respect. Instead, for example, the holder and the at least two axial extensions can be produced jointly with casting methods.

Special advantages in terms of the casting production of the holder and the axial extensions of the holder can be achieved if the bottom side of an axial extension (that is, the side that is facing the tensioning piston) is arranged at a defined radial distance from the cylindrical hollow space of the holder (or an imaginary extension of the inner lateral surface of the cylindrical hollow space). The distance should be greater than 1 mm and preferably between 2 mm to 3 mm. In this way, the holder can be produced economically, for example, with the help of an open-close tool and a pusher.

In another construction, the tensioning piston is guided in a holder and encloses a high-pressure space together with the holder. By the use of a non-return valve shaped as a refill valve with, for example, a spherical or plate-shaped valve body, pressurized hydraulic medium is led into the high-pressure space. If a force is exerted by a control drive, especially a chain drive, on the tensioning piston pretensioned by a spring against the holder, the tensioning piston is forced into the holder; vibrations of the control drive are damped by hydraulic medium being discharged via a leakage gap. For reducing pressure spikes, an over-pressure valve can be arranged in the high-pressure space.

To be able to guarantee enough tension on the chain, in another construction, the tensioning piston is tensioned, on one hand, by a spring against the holder. For example, when the engine is started, large forces can act on the tensioning piston so that an excessive retraction of the tensioning piston cannot be effectively prevented. In order to prevent excessive retraction of the tensioning piston, the tensioning piston has locking grooves on its outer peripheral surface at least along an axial section. The locking grooves are arranged peripherally along the outer periphery and shaped such that the tensioning piston can be extended, but a retraction of the tensioning piston is prevented. The locking grooves each have two groove walls that can be brought into contact with the help of the locking element on one side with the clamping stop and on the other side with the sliding stop. The groove wall that can be brought into contact with the clamping stop during retraction has a steeper profile than the opposite groove wall that can be brought into contact with the sliding stop. An excessive retraction is effectively stopped in this way, because the locking element forms a positive-fit connection between the locking groove and clamping stop. For an extension of the tensioning piston, the locking element can be brought into contact with the sliding stop, whereby the locking element slides or can be forcibly pushed over the groove wall into the closest locking groove. The axial distance between the clamping stop and the sliding stop defines the return stroke of the tensioning piston together with the groove width.

In another construction, the at least two axial extensions can be formed as connecting pieces extending in the axial direction and can form the sliding stop on one side, facing the holder. The sliding stop can be formed, for example, such that the at least two axial extensions are each formed in the shape of a T-piece. The at least two radial extensions of the locking element thus can be brought into contact with the sliding stop when the tensioning piston is extended, wherein the sliding stop is formed by the hook-shaped extensions of the T-piece.

In another construction, the clamping stop can be formed by formations on an end side of the holder. The clamping stop can be arranged at an angle with respect to the plane running orthogonal to a plane containing the longitudinal axis of the holder. The clamping stop plane is thus the plane that contains essentially the linear contact region between the clamping stop and locking element. The clamping stop plane thus can also run orthogonal to the plane that contains the longitudinal axis of the holder. The clamping stop can be a chamfer that runs along a part of the periphery of the opening of the holder.

The locking element can have, for example, an elastically flexible construction as a wire; the radius of the annular sections thus can be increased when the locking element is pushed over one of the groove walls. The locking element, however, could also have a bending area in the area of one of the at least two radial extensions, whereby the locking element widens like a kind of clamp.

In another construction, at least one of the at least two axial extensions is arranged in the radial direction between the tensioning piston and one of the at least two radial extensions of the locking element. Another of the at least two radial extensions thus can have an open construction, so that the axial extension is not enclosed. For a total of two radial extensions and two axial extensions, thus exactly one of the at least two axial extensions is arranged in the radial direction between the tensioning piston and one of the two radial extensions.

In another construction, the at least two axial extensions and the locking ring can be arranged in an arbitrary relation to the holder. For example, for the presence of exactly two axial extensions, an imaginary connecting line can run between the exactly two axial extensions parallel or perpendicular to a plane that corresponds to the plane of the contact surface between the holder and installation environment.

In another construction, the inner guide can be a sleeve that is inserted into the cylindrical hollow space of the holder. The sleeve can have a shape that is open on one side, whereby a connection to the hydraulic medium supply is created. On the base of the sleeve facing the high-pressure space, there can be an opening by which the high-pressure space is supplied with hydraulic medium. The side of the sleeve base bounding the high-pressure space can comprise a valve seat that prevents a return flow of the hydraulic medium from the high-pressure space with the help of, for example, a spherical or plate-shaped closing body.

In another construction, the tensioning piston can be guided on and move relative to the outer periphery of the inner guide, wherein a leakage gap or a partial section of the leakage gap can be formed at this point. In an area between the inner periphery of the cylindrical hollow space of the holder and the outer periphery of the inner guide there can be an opening for venting. The hydraulic tensioning device is thus suitable primarily for an overhead installation (upside-down tensioning device). Installation with a tensioning device opposite the direction of gravity (that is, upward) is also possible, however, the special advantage of a design with an inner guide preferably made from steel consists in being able to realize a precise leakage gap between the inner guide and the tensioning piston also made preferably from steel.

In one advantageous embodiment, two of the at least two axial extensions enclose a locking section in the peripheral direction, wherein one of the at least two annular sections can be brought into engagement with one of the locking grooves in the area of this locking section; in the area of the locking sections, the tensioning piston is not surrounded by the holder, so that the locking grooves are accessible from the outside. The locking element thus can engage in the peripheral direction between the axial extensions in the locking grooves. The function of the locking mechanism thus can be monitored in the installed state, which simplifies the maintenance of the internal combustion engine. In addition, the locking element is an outer component of the tensioning device; thus, it is accessible from the outside, which simplifies the assembly and disassembly of the locking element. In addition, a securing element can keep one of the at least two annular sections in the area of the locking section engaged with one of the locking grooves. In this way, a transport securing mechanism can be implemented, because an extension of the locking element in an adjacent locking groove is stopped.

In one improvement, the locking element has two annular sections and two radial extensions, wherein the holder has two axial extensions that enclose two locking sections. The locking element can engage with two annular sections in one of the locking grooves, wherein secure clamping is made possible. In addition, the geometric complexity of the locking element can be reduced, because only two axial extensions are provided; the locking element consequently has two radial extensions.

In another advantageous embodiment, the holder has a cylindrical hollow space, wherein the tensioning piston is guided with the help of the cylindrical hollow space; alternatively, the holder comprises a cylindrical hollow space and a sleeve inserted into the cylindrical hollow space, wherein the tensioning piston is guided with the help of the sleeve. Special cost advantages are produced if the tensioning piston is guided directly in a cylindrical hollow space of the holder. The holder can be constructed, for example, as a housing made from aluminum and can have the cylindrical hollow space for guiding the tensioning piston. Alternatively, the cylindrical hollow space can hold a sleeve; in this case, the sleeve, for example, made from steel, the non-return valve, and additional components can be installed pre-assembled.

In another advantageous embodiment, the at least two axial extensions have, in an axial section between the clamping stop plane and the sliding stop plane in the peripheral direction, on both sides a tapered section, wherein the sliding stop is formed in the sliding stop plane. The sliding stop is thus located there, where the tapered section ends. The at least two axial extensions can have T-shaped constructions, wherein the connecting piece of the T extends between the sliding stop plane and the clamping stop plane and the roof of the T forms the sliding stop plane, from which, facing the connecting piece, the sliding stop emerges. The roof of the T can run essentially tangential to the peripheral direction. Alternatively, the roof of the T, forming a circular section, can run in the peripheral direction, wherein the first alternative is advantageous with respect to the casting producibility.

In another advantageous embodiment, one of the at least two radial extensions has a gap of the locking element. The locking element thus does not have a closed peripheral construction. A widening of the locking element thus can result from an elastic extent of the at least two circular sections, from a clamp-shaped bending of the locking element or from both sections. In particular, the gap allows a clamp-shaped bending of the locking element constructed, for example, as a wire, wherein the bending area lies essentially in the section of the radial extension that lies opposite the radial extension with the gap.

In one improvement, in the area of the gap of the locking element there are two end sections of the locking element opposite each other, wherein partial sections of the two end sections are spaced apart from each other in the peripheral direction, extend outward in the radial direction, and can be brought into contact with the sliding stop. Despite a gap in the locking element, a contact on the sliding stop can be guaranteed. Other radial extensions of the locking element that have no gap can be shaped accordingly.

In another advantageous improvement, actuation sections connect to the partial sections in the direction of the gap of the locking element, wherein the actuation sections extend in the direction of the opposite end section. The profile and angle of the actuation sections are shaped such that a compression of the ends causes the locking element to widen. In this way, a manually introduced resetting of the tensioning piston of a hydraulic tensioning device is possible.

In one advantageous embodiment, one of the at least two radial extensions has a tapered section and a gap in the locking element, wherein the locking element can be brought into contact with the sliding stop in the area of the tapered section. In one advantageous refinement, a widened area can be connected to the area of the tapered section. The widened area can have a V-shaped form. The construction with a widened area advantageously simplifies the assembly of the locking element.

One improvement that can be assembled in an especially advantageous way relates to a tensioning device, wherein a first end and a second end of the locking element enclose the gap and wherein—at least in a not-pretensioned state of the locking element—the distance between the first end and the second end is greater in the peripheral direction than between partial areas of the locking element that form the tapered section. The assembly of the tensioning device can be realized such that the locking element is pushed in an axial area between the clamping stop plane and the locking stop plane in the radial direction over the first of the at least two axial extensions and then over the tensioning piston and the second of the at least two axial extensions.

In particular, for the use of a locking element without actuation sections, an extended tensioning piston can be reset in a first step such that a blocking element is inserted in an axial area between the clamping stop plane and the sliding stop plane in the tangential direction such that the blocking element is arranged, after being inserted, between the locking element and the clamping stop. In a second step, the extended tensioning piston is moved in the direction of the holder. A screwdriver, nail, wire, or clip can be used, for example, as the blocking element. It is advantageous that a special tool is not necessary. After the blocking element has been inserted and the tensioning piston is moved in the direction of the holder, the locking element can no longer be brought into contact with the clamping stop. A positive-fit connection between the locking groove and clamping stop is prevented, whereby the locking element can be moved into adjacent locking grooves. In this way, the tensioning piston can be pushed into the holder and fixed with the help of a transport securing mechanism.

The resetting of the tensioning piston simplifies a disassembly and subsequent assembly, for example, of a component of an internal combustion engine. As an alternative method, a design with a locking element that has actuation elements in the area of the gap can be used. Compressing the actuation sections enables the locking element to be widened, whereby a positive-fit connection between the locking groove, locking element, and clamping stop is prevented.

BRIEF DESCRIPTION OF THE DRAWINGS

The invention will be explained below with reference to an embodiment.

DETAILED DESCRIPTION

Figure 1:
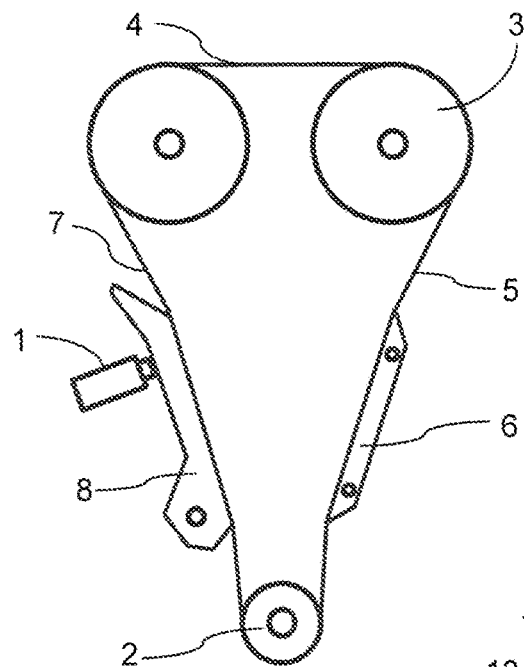
FIG. 1 shows a chain drive for an internal combustion engine with its essential components.

In FIG. 1, a chain drive with a hydraulic tensioning device 1 according to the class for an internal combustion engine is shown with its essential components. A chain drive comprises, in principle, a drive chain wheel 2 connected to the crankshaft, two driven chain wheels 3 each connected to a camshaft, and a control chain 4 that connects the drive chain wheel 2 to the driven chain wheels 3. By the tensioned chain section 5 of the control chain 4, a torque of the crankshaft is transmitted to the camshafts. The control chain 4 is guided on the tensioned chain section 5 by a guide rail 6.

The control chain 4 is tensioned on its loose chain section 7 in order to be able to guarantee its functionality throughout the operating period. For this purpose, the control chain 4 is loaded with a tensioning force by a hydraulic tensioning device 1 and a tensioning arm 8. Hydraulic tensioning devices 1 also guarantee damping of the chain drive. The hydraulic tensioning device 1 according to the described embodiment is constructed such that the tensioning piston 9 is tensioned downward in the assembled state of the tensioning device 1 in the direction of gravity, without allowing hydraulic medium to escape.

Figure 2:
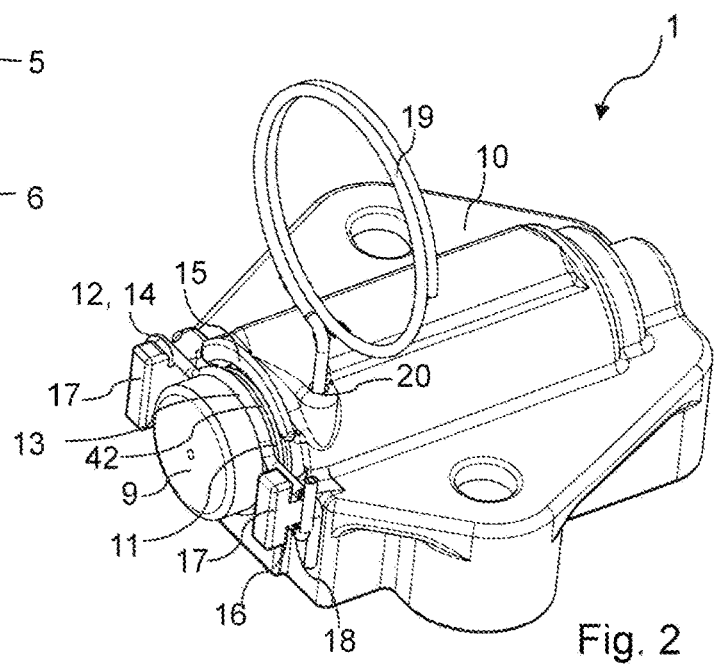
FIG. 2 shows an embodiment of a hydraulic tensioning device.

In FIG. 2, a hydraulic tensioning device 1 of a chain drive is shown with a tensioning piston 9 that is guided in a cylindrical hollow space of a holder 10 and has locking grooves 11 on its outer peripheral surface. A latching element 12 that has two annular sections 13 and two radial extensions 14 is also shown, wherein the locking element 12 engages with one of the latching grooves 11 with the help of the at least two annular sections 13. A clamping stop 15 and a sliding stop 16 are arranged spaced apart from each other in the axial direction, wherein two axial extensions 17 extend in the axial direction between a clamping stop plane 32 and a sliding stop plane 33 (see FIG. 3). The two axial extensions 17 have a tapered section 18 on both sides in an axial section between the clamping stop plane 32 and the sliding stop plane 33 in the peripheral direction, wherein the sliding stop 16 is formed in the sliding stop plane 33. The two axial extensions 17 enclose a locking section 42 in the peripheral direction, wherein the two annular sections 13 can be brought into engagement with one of the locking grooves 11 in the area of the locking section 42.

The two axial extensions 17 and the tensioning piston 9 do not enclose the two radial extensions 14 of the locking element 12. The tensioning device 1 is shown in a transport position with a transport securing wire 19 that engages tangentially in a locking groove 11 via an opening 20 in the housing. The tensioning piston 9 is thus secured against moving outward.

Figure 3:
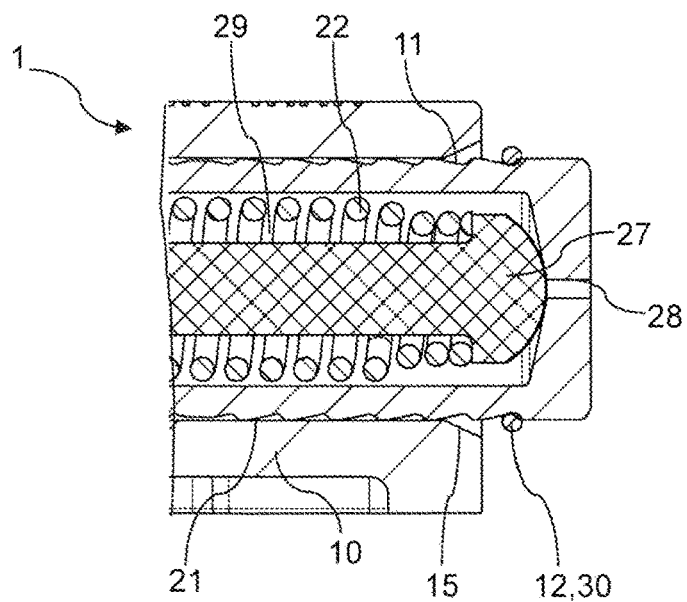
FIG. 3 shows a longitudinal section of the hydraulic tensioning device from FIG. 2.

FIG. 3 shows a longitudinal section through the tensioning device 1. Shown is the holder 10 with the cylindrical hollow space 21 in which the tensioning piston 9 is guided. The tensioning piston 9 and inner lateral surface of the cylindrical hollow space 21 enclose a high-pressure space 22 that is supplied with hydraulic medium. In the high-pressure space 22, there is an element for reducing the full volume 27 that covers a venting opening 28 on the end side. The tensioning piston 9 is pretensioned by a spring 29 in the extension direction and thus pretensioned against the tensioning rail 8 after installation.

The tensioning piston 9 has, on the outer periphery, locking grooves 11, wherein the locking element 12 engages in the outermost locking groove 30. The locking grooves 11 are arranged peripherally along the outer periphery and shaped such that an extension of the tensioning piston 9 is enabled, but a retraction of the tensioning piston 9 is prevented: The locking grooves 11 each have two groove walls that can be brought into contact with the help of the locking element 12 on one side with the clamping stop 15 and on the other side with the sliding stop 16. The groove wall that can be brought into contact with the clamping stop 15 during retraction has a steeper profile than the opposite groove wall that can be brought into contact with the sliding stop. Excessive retraction is effectively stopped in this way, because the locking element 12 forms a positive-fit connection between the locking groove 30 and clamping stop 15. If the tensioning piston 9 is extended, the locking element 12 can be brought into contact with the sliding stop 16, wherein the locking element 12 slides or can be forcibly pushed via the groove wall into the closest locking groove 30. In the holder 10 there is a passage 41 for a securing wire 19 that engages tangentially into one of the locking grooves 11.

Figures 4, 5:
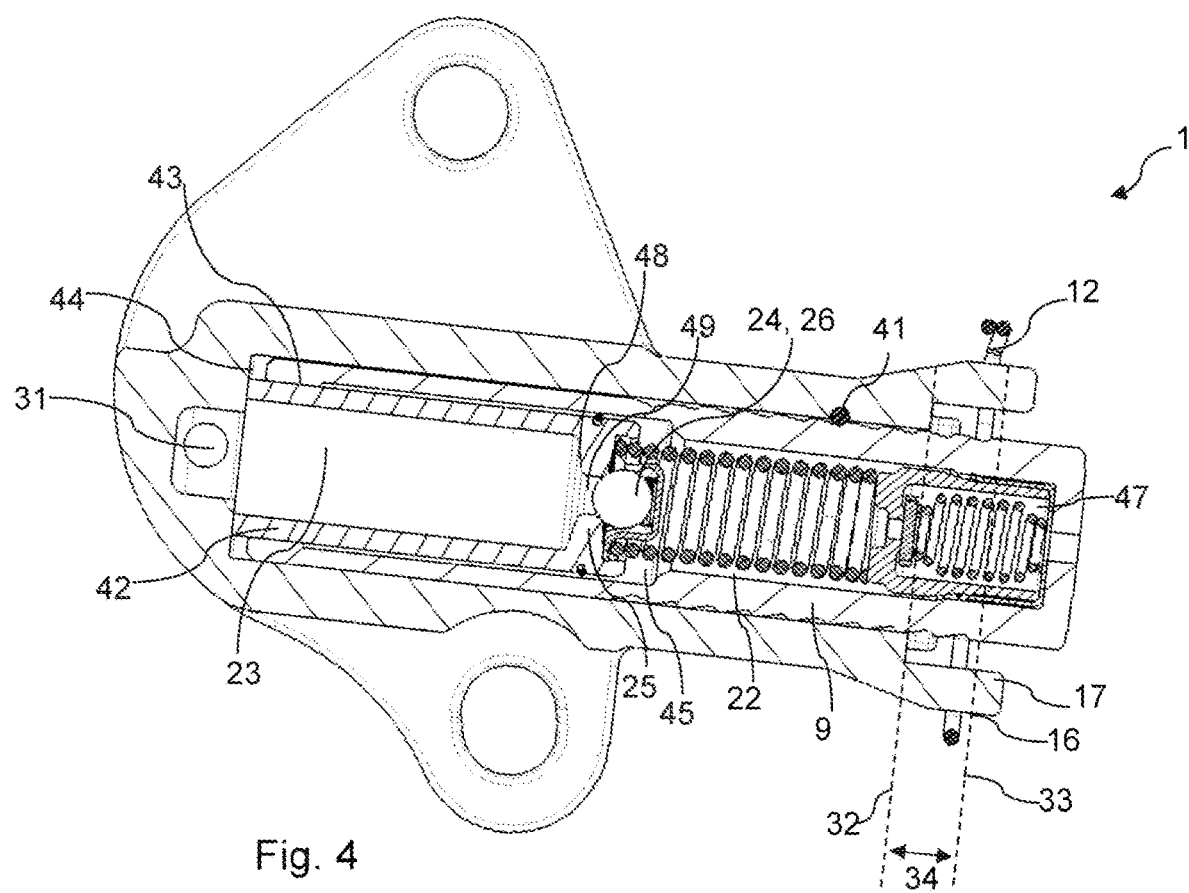
FIG. 4 shows a second longitudinal section of the hydraulic tensioning device from FIG. 2.
FIG. 5 shows a top view of the hydraulic tensioning device from FIG. 2.

The axial extensions 17 from which the sliding stop 16 emerges are shown in FIG. 4. The locking element 12 engages with the outermost locking groove 30 and is located in an axial section between the clamping stop plane 32 and the sliding stop plane 33. The axial distance between the clamping stop plane 32 and the sliding stop plane 33 defines the return stroke 34 of the tensioning piston 9. The tensioning piston 9 and inner lateral surface of the cylindrical hollow space 21 enclose the high-pressure space 22 that is supplied with hydraulic medium via a supply hole 31, a supply line 23, and a non-return valve 24 that has a valve seat 25 and a spherical closing body 26.

The inner guide 53 is constructed as a sleeve that is inserted into the cylindrical hollow space of the holder 21 and extends into a hollow space 45 of the piston 9. The inner guide 53 constructed as a sleeve has a design that is open on one side, wherein a connection to the hydraulic medium supply 31 is created. On the sleeve base 48 facing the high-pressure space 22, there can be an opening 49 by which the high-pressure space 22 is supplied with hydraulic medium. The side of the sleeve base 48 bounding the high-pressure space 22 can comprise a valve seat 25 that prevents a return flow of hydraulic medium from the high-pressure space with the help of, for example, a spherical or plate-shaped closing body.

The tensioning body 9 is guided on and can move relative to the outer periphery of the inner guide 53 constructed as a sleeve, wherein a leakage gap 43 or a partial section of the leakage gap 43 is formed at this point. In an area between the inner periphery of the cylindrical hollow space of the holder and the outer periphery of the inner guide, there can be an opening for venting 44. The hydraulic tensioning device is thus primarily suitable for an overhead installation (upside-down tensioning device), wherein an over-pressure valve 47 can be used for venting.

A top view of the hydraulic tensioning device 1 is shown in FIG. 5. The tensioning piston 9 is inserted into the cylindrical hollow space of the holder 10 shaped as a housing, wherein the locking element 12 sits on the tensioning piston 9. The locking element 12 comprises two annular sections 13 that engage in a locking groove 11 of the tensioning piston 9. A first radial extension 14a of the locking element 12 encloses the first axial extension 17a with the tensioning piston 9. A second radial extension 14b encloses the second axial extension 17b with the tensioning piston 9. The second radial extension 14b has a gap 35 of the locking element 12, wherein two end sections 36 of the locking element 12 are opposite each other in the area of the gap 35 of the locking element 12. Partial sections 40 of the two end sections 36 are arranged spaced apart from each other in the peripheral direction, extend radially outward, and can be brought into contact with the sliding stop 16. In the direction of the gap 35 of the locking element 12, actuation sections 37 connect to the partial sections 40, wherein the actuation sections 37 extend in the direction of the opposite end section 36.

Figure 6:
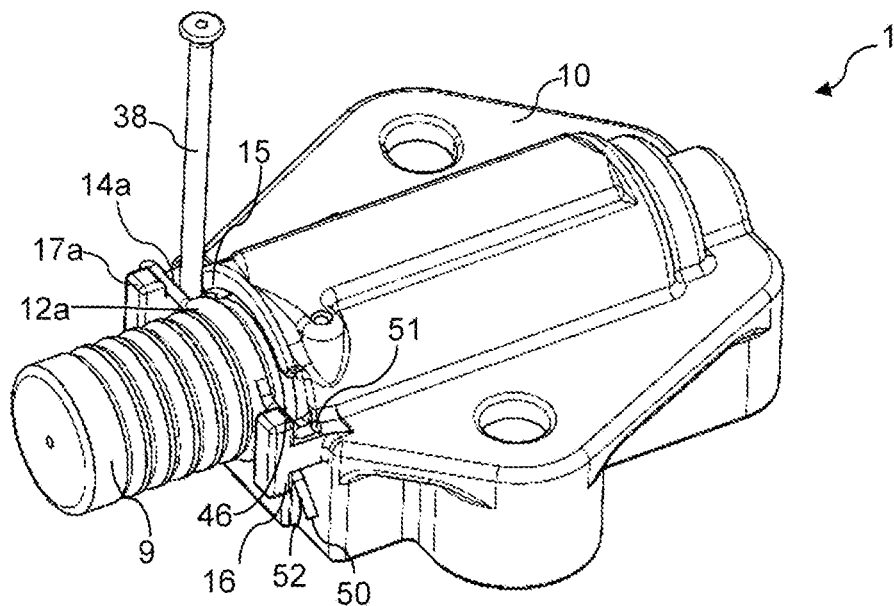
FIG. 6 shows the hydraulic tensioning device from FIG. 2 with an alternative shape of the locking element.

In FIG. 6, the hydraulic tensioning device 1 is shown with an alternatively shaped locking element 12a. In this design, only the first of the two axial extensions 17a is arranged in the radial direction between the—completely extended—tensioning piston 9 and the first of the two radial extensions 14a of the locking element 12a. The second radial extension 14b is not completely surrounded by the locking element 12a.

The second of the two radial extensions 14b has a tapered section 46 and a gap 35 of the locking element, wherein the locking element can be brought into contact in the area of the tapered section 46 with the sliding stop 16. In the area of the tapered stop 46, an area of the widened area 52 connects, wherein the widened area has a V-shaped form. The construction with a widened area 52 advantageously simplifies the assembly of the locking element. In this way, the gap 35 is enclosed in the first end 50 and a second end 51 of the locking element 12, wherein—at least in a non-pretensioned state of the locking element 12—in the peripheral direction the distance between the first end 50 and the second end 51 is larger than between partial areas of the locking element that form the tapered section 46.

Due to the lack of actuation sections 37 there is a need to simplify the widening of the locking element 12a by an aid. The tensioning piston 9 of the hydraulic tensioning device 1 can be reset in that, in a first step, a blocking element shaped as a nail 38 is inserted into an axial area between the clamping stop plane 32 and the sliding stop plane 33 in the radial direction (tangential to a circle drawn around the longitudinal axis) such that the nail is arranged after being inserted between the locking element 12a and the clamping stop 15 and also between the tensioning piston 9 and one of the axial extensions 17. Then, in a second step, the extended tensioning piston 9 can be moved and secured in the direction of the holder 10, because the alternative locking element 12a cannot be brought into a positive-fit connection with the clamping step 15.

Figure 7:
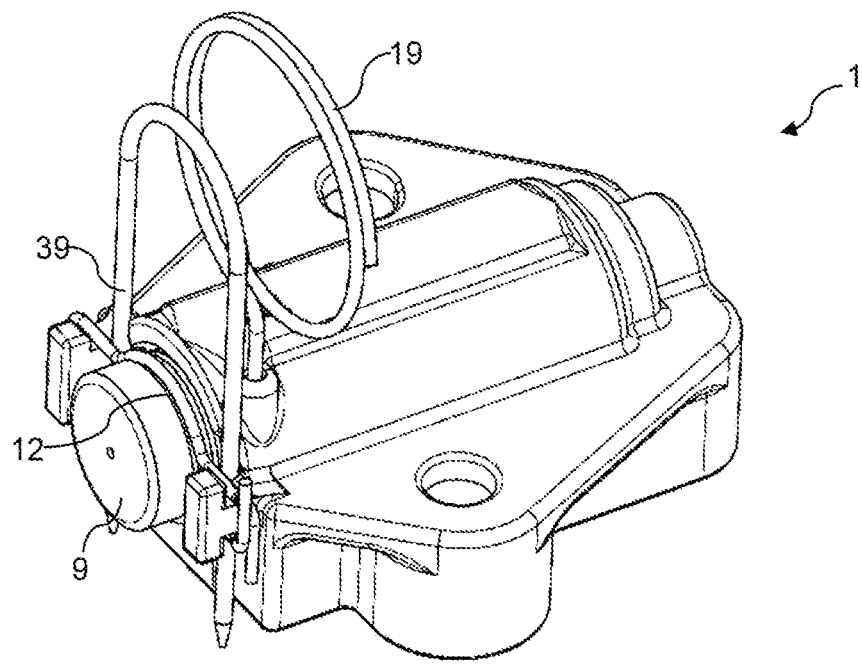
FIG. 7 shows the hydraulic tensioning device from FIG. 2 with an alternative shape of the blocking element.

The hydraulic tensioning device 1 with a tensioning piston 9 moved in the direction of the holder 10 and secured with a securing wire 19 is shown in FIG. 7. Shown is a tensioning device 1 with a locking element 12 of the type described above. In addition, an alternative blocking element shaped as a bracket 39 is shown.

Figure 8:
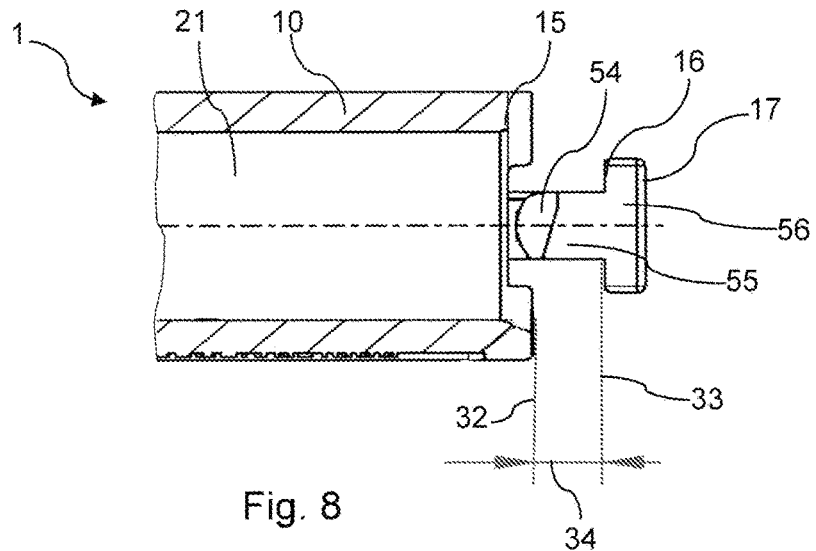
FIG. 8 shows the hydraulic tensioning device from FIG. 2 with an alternative reset ramp.

FIG. 8 shows the hydraulic tensioning device 1 from FIG. 2 with an alternative reset ramp 54. Shown is the holder 10 with the cylindrical hollow space 21 on whose opening the clamping stop 15 is formed. The axial extension 17 extends in the axial direction away from the holder 10 and ends with the sliding stop 16. The axial position of the clamping stop plane 32 and the sliding stop plane 33 have a significant influence on the maximum possible return stroke 34 of a (not shown) tensioning piston before the locking element is moved into an adjacent locking groove 11. In the area of the return stroke 34, the reset ramp 54 is arranged. The reset ramp 54 is a radially inward extending raise in the connecting piece 55 of the T-shaped axial extension 17. The T-shaped axial extension 17 connects to a roof 56.

Thus, in a first step, a not-shown blocking element (see, for example, also FIG. 6, reference symbol 38 or FIG. 7, reference symbol 39), for example, a screwdriver, can be inserted in an axial area between the clamping stop plane 32 and the sliding stop plane 33 in the tangential direction to the cylindrical hollow space 21 or in a not-shown tensioning piston 9 such that the blocking element is arranged after being inserted between a not-shown locking element (see, for example, FIGS. 1 to 7, reference symbols 12 and 12*a*) and the clamping stop 15. The reset ramp 54 is therefore provided on one of the at least two axial extensions 17 that is surrounded by a radial extension 14 without a gap 35 of the locking element 12 (see, for example, FIG. 5, axial extension 17*a*). The reset ramp 54 ensures that the blocking element is positioned parallel to the sliding stop plane 33. In addition, the locking element 12 can be fixed between the blocking element and sliding stop 16 in the axial direction. In a second step, the not-shown, extended tensioning piston 9 can be moved in the direction of the holder 10 and then fixed with a transport securing wire 19.

Figure 9:
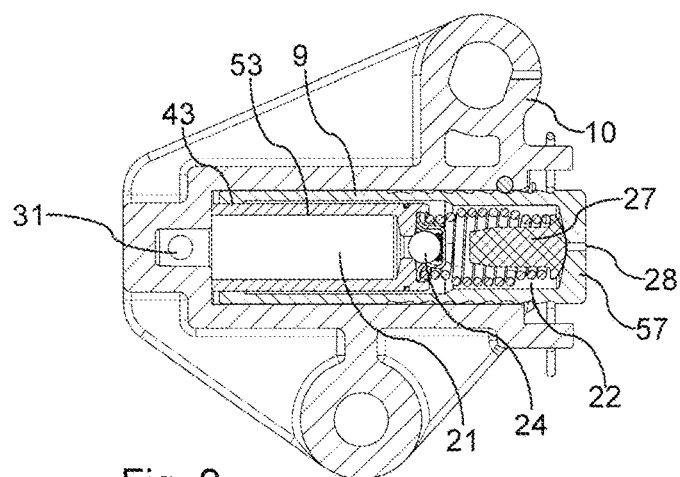
FIG. 9 shows another example of a hydraulic tensioning device with a venting opening on the tensioning piston head.

FIG. 9 shows another embodiment of a hydraulic tensioning device. By a supply line 31, motor oil is led into the cylindrical hollow space 21 of the holder 10. By a non-return valve 24 that is held by an inner guide 53 shaped as a sleeve, the motor oil is led into the high-pressure space 22 that is bounded by the tensioning piston 9 and by the inner guide 53 shaped as a sleeve. On the tensioning piston head 57 there is a venting opening 28 that is covered by an element for reducing the filling volume (volume reducer) 27. A leakage gap 43 is formed between the inner guide 53 shaped as a sleeve and the inner lateral surface of the tensioning piston 9. In a holder that is made from aluminum and that is produced using die-casting technology, an especially precise leakage gap 43 can be prepared between the inner guide 53 shaped as a sleeve and made from steel and the tensioning piston 9 also made from steel. The embodiment shown in FIG. 9 is suitable for a tensioning direction opposite the direction of gravity, that is, upward.

Figure 10:
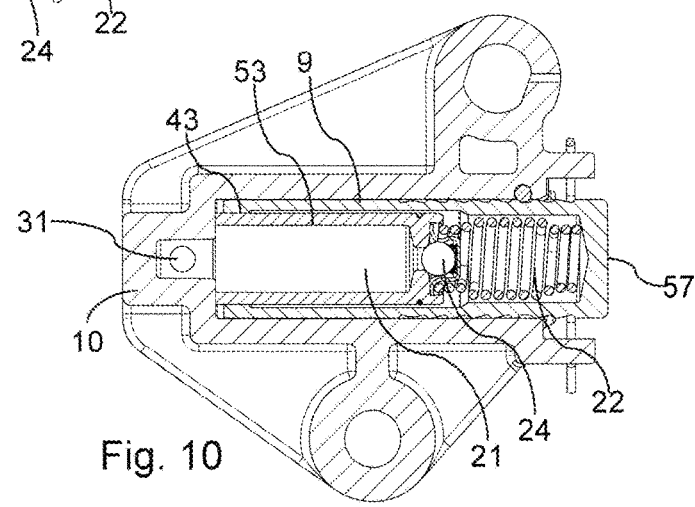
FIG. 10 shows another example of a hydraulic tensioning device without a venting opening on the piston head.

The alternative embodiment shown in FIG. 10 differs from the construction of FIG. 9 in that, on the piston head there is no venting opening 28. The venting is located in an area of the cylindrical hollow space 21 facing the supply line 31. The embodiment shown in FIG. 10 is thus suitable for a downward tensioning direction in the direction of gravity.

LIST OF REFERENCE SYMBOLS

1 Hydraulic tensioning device
2 Drive chain gear
3 Driven chain gear
4 Control chain
5 Tensioned chain section
6 Guide rail
7 Loose chain section
8 Tensioning arm
9 Tensioning piston
10 Holder
11 Locking groove
12 Locking element
12*a* Alternatively shaped locking element
13 Annular section
14 Radial extension
14*a* First radial extension
14*b* Second radial extension
15 Clamping stop
16 Sliding stop
17 Axial extension
17*a* First axial extension
17*b* Second axial extension
18 Tapered section
19 Transport securing wire
20 Opening
21 Cylindrical hollow space
22 High-pressure space
23 Supply line
24 Non-return valve
25 Valve seat
26 Spherical closing body
27 Element for reducing the filling volume
28 Venting opening
29 Spring
30 Outermost locking groove
31 Supply hole
32 Clamping stop plane
33 Sliding stop plane
34 Return stroke
35 Gap
36 End section
37 Actuation section
38 Nail
39 Bracket
40 Partial section
41 Passage
42 Locking section
43 Leakage gap
44 Opening for venting
45 Hollow space of the tensioning piston
46 Tapered section
47 Over-pressure valve
48 Sleeve base
49 Opening
50 First end
51 Second end
52 Widened area
53 Inner guide shaped as a sleeve
54 Reset ramp
55 Connecting piece of the T-shaped axial extension
56 Roof of the T-shaped axial extension
57 Tensioning piston head

The invention claimed is:

1. A hydraulic tensioning device for a chain drive, the hydraulic tensioning device comprising:
a holder;
a tensioning piston that is guided in the holder, the tensioning piston has locking grooves located on an outer peripheral surface thereof;
an inner guide that extends into a hollow space of the piston;

a locking element that has at least two annular sections and at least two radial extensions, the locking element is movable into engagement with one of the locking grooves with the at least two annular sections thereof;

a clamping stop and a sliding stop that are spaced apart from each other in an axial direction on the holder, at least two axial extensions on the holder that extend in the axial direction between a clamping stop plane defined by the clamping stop and a sliding stop plane defined by the sliding stop that are arranged separated from each other in an area of the sliding stop plane, the at least two axial extensions partially enclose a periphery of the at least two radial extensions but do not fully enclose the at least two radial extensions.

2. The hydraulic tensioning device according to claim 1, wherein two of the at least two axial extensions enclose a locking section in a peripheral direction, and one of the at least two annular sections is movable into engagement with one of the locking grooves in an area of the locking section.

3. The hydraulic tensioning device according to claim 2, wherein the locking element has exactly two of the annular sections and exactly two of the radial extensions and the holder has exactly two of the axial extensions that enclose two locking sections in a circumferential direction.

4. The hydraulic tensioning device according to claim 1, wherein the holder comprises a cylindrical hollow space, the tensioning piston is guided by the cylindrical hollow space or the holder comprises a cylindrical hollow space and the tensioning piston is guided by the inner guide.

5. The hydraulic tensioning device according to claim 1, wherein the at least two axial extensions each have a tapered section on both sides in a peripheral direction in an axial section between the clamping stop plane and the sliding stop plane, and the sliding stop is formed in the sliding stop plane.

6. The hydraulic tensioning device according to claim 1, wherein one of the at least two radial extensions defines a gap in the locking element.

7. The hydraulic tensioning device according to claim 6, wherein in an area of the gap of the locking element, two end sections of the locking element extend in a direction opposite each other, and partial sections of the two end sections are spaced apart from each other in a peripheral direction, extend outward in a radial direction, and are movable into contact with the sliding stop.

8. The hydraulic tensioning device according to claim 7, further comprising actuation sections that connect to the partial sections in a direction of the gap of the locking element, and the actuation sections extend in a direction of the opposite end section.

9. The hydraulic tensioning device according to claim 1, wherein one of the at least two radial extensions has a tapered section and includes a gap of the locking element, and the locking element into contact with the sliding stop in an area of the tapered section.

10. The hydraulic tensioning device according to claim 9, wherein the locking element includes a first end and a second end that enclose the gap, and in a peripheral direction a distance between the first end and the second end is greater than a distance between partial areas of the locking element that form the tapered section.

11. A hydraulic tensioning device for a chain drive, the hydraulic tensioning device comprising:

a holder;

a tensioning piston guided in the holder, the tensioning piston including locking grooves on an outer peripheral surface thereof;

an inner guide that extends into a hollow space of the piston;

a locking element that has two annular sections and two radial extensions, the locking element is movable into engagement with one of the locking grooves with the two annular sections thereof;

a clamping stop and a sliding stop that are spaced apart from each other in an axial direction on the holder;

two axial extensions on the holder, the sliding stop being located on the axial extensions, the two axial extensions extend in the axial direction between a clamping stop plane defined by the clamping stop and a sliding stop plane defined by the sliding stop, the two axial extensions are arranged separated from each other on opposite sides of the tensioning piston in an area of the sliding stop plane, the two radial extensions of the locking element extend radially beyond the two axial extensions and the tensioning piston, and the two axial extensions each include an enlarged head portion and a connecting portion that is smaller than the enlarged head portion.

12. The hydraulic tensioning device according to claim 11, wherein the two axial extensions enclose a locking section in a peripheral direction, and one of the two annular sections is movable into engagement with one of the locking grooves in an area of the locking section.

13. The hydraulic tensioning device according to claim 11, wherein the tensioning piston is guided by a cylindrical hollow space in the holder or by the inner guide located in the cylindrical hollow space in the holder.

14. The hydraulic tensioning device according to claim 11, wherein the two axial extensions each have a tapered section on both sides in a peripheral direction in an axial section between the clamping stop plane and the sliding stop plane.

15. The hydraulic tensioning device according to claim 11, wherein one of the two radial extensions defines a gap in the locking element that allows movement of the two annular sections away from one another.

16. The hydraulic tensioning device according to claim 15, wherein in an area of the gap of the locking element, two end sections of the locking element extend in a direction opposite each other.

17. The hydraulic tensioning device according to claim 11, wherein each of the two radial extensions extends around a respective one of the axial extensions.

18. The hydraulic tensioning device according to claim 11, wherein the two radial extensions each have a tapered section, and the locking element is movable axially into contact with the sliding stop in an area of the tapered section.

19. The hydraulic tensioning device according to claim 11, wherein two axial extensions have a T-shaped construction.

* * * * *